United States Patent [19]

van der Lely et al.

[11] 4,126,274
[45] Nov. 21, 1978

[54] DEVICE FOR SPREADING DISTRIBUTABLE MATERIAL

[76] Inventors: Ary van der Lely; Cornelis J. G. Bom, both of 10, Weverskade, Maasland, Netherlands

[21] Appl. No.: 774,218

[22] Filed: Mar. 3, 1977

[30] Foreign Application Priority Data

Mar. 5, 1976 [NL] Netherlands ..................... 7602299

[51] Int. Cl.² ............................................. A01C 3/06
[52] U.S. Cl. .................................... 239/664; 222/611
[58] Field of Search ............... 222/611; 172/698, 712, 172/722–725, 730, 746, 764, 765, 768, 770, 774, 126, 127, 132; 239/664

[56] References Cited

U.S. PATENT DOCUMENTS

| | | | |
|---|---|---|---|
| 384,740 | 6/1888 | Blanchard | 172/722 |
| 413,406 | 10/1889 | Menefee | 172/126 X |
| 490,092 | 1/1893 | Williams | 222/611 |
| 1,243,019 | 10/1917 | Waterman | 172/126 X |
| 2,947,544 | 8/1960 | Hurt | 239/664 X |
| 2,987,125 | 6/1961 | Singleton | 172/764 X |

FOREIGN PATENT DOCUMENTS 72,621 10/1944 Norway ........................... 172/768

*Primary Examiner*—John J. Love
*Attorney, Agent, or Firm*—Mason, Mason & Albright

[57] ABSTRACT

A marker in combination with a material spreader having a hopper and a plurality of conveyor belts leading to aligned material spreading members which rotate and broadcast the material to the underlying ground, the markers being connected by chains to carriers mounted outboard of the outboard spreading members to demarcate the outboard limits of material broadcast from the outboard spreaders. Each marker has a V-shaped stabilizing member with a rod rigidly connected to the apex of the stabilizing member to bisect the angle of said apex which is about 60° and to extend between the arms of the stabilizing member so that the longitudinal axes of the arms and the rod fall in the same plane. The arms are of equal lengths and are shorter than the rod which has on its outer end a pair of plates extending perpendicular to the aforesaid plane, the plates being trapazoid-shaped as seen from the side and adapted to penetrate the underlying ground. The chain from the carrier connects to the marker in a space between the end of the rod and at the aforesaid apex. The marker is symmetrical relative to the aforesaid rod whereby it will continue to penetrate the soil and create a furrow therein irrespective of which plate is penetrating the ground.

26 Claims, 4 Drawing Figures

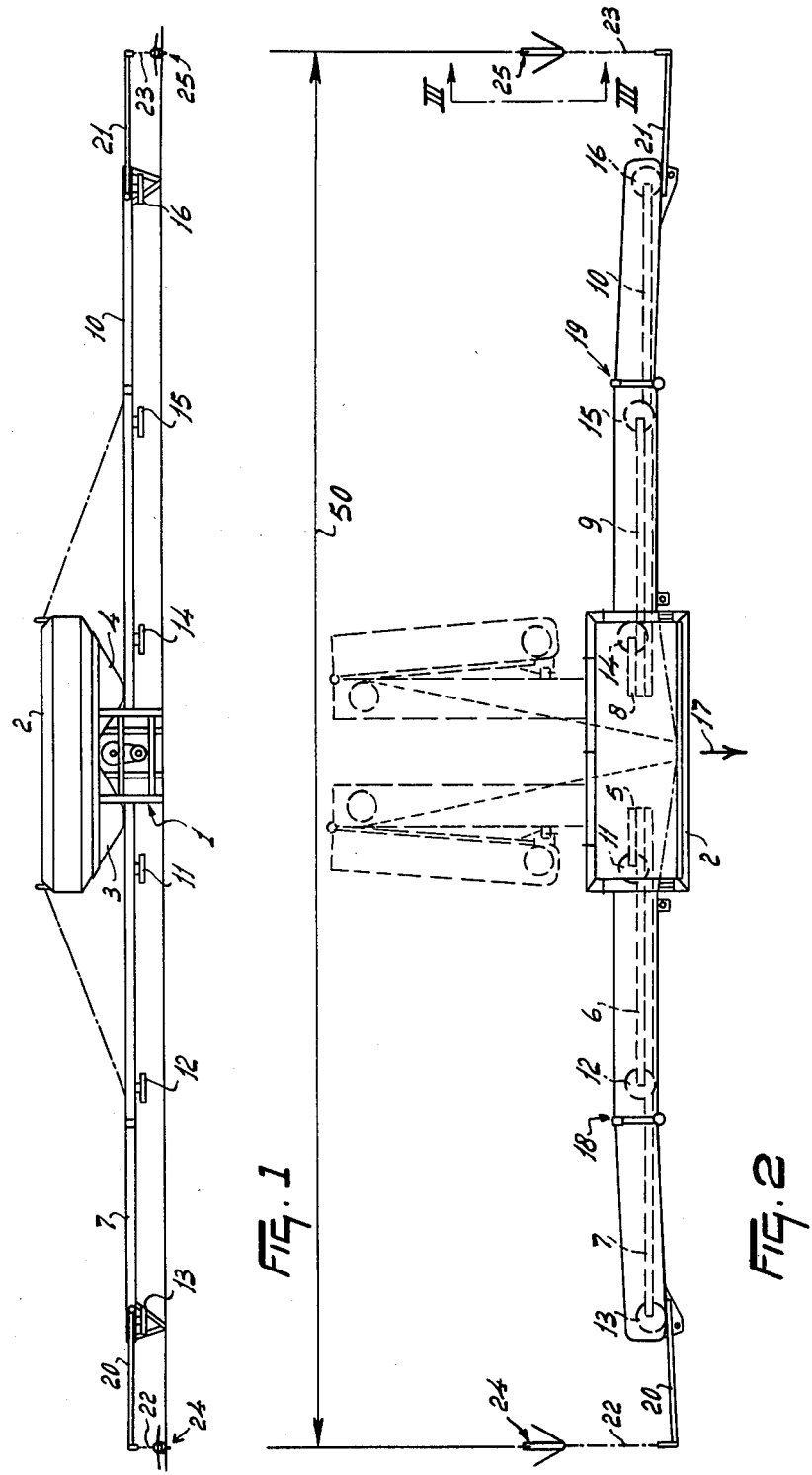

DEVICE FOR SPREADING DISTRIBUTABLE MATERIAL

SUMMARY OF THE INVENTION

This invention relates to a spreader for spreading distributable material, for example, granular or powdery material or both.

According to the present invention there is provided a spreader comprising a frame, a hopper and at least one distributing member for distributing material supplied from the hopper, and a marker, connected to the spreader, which is provided with at least one stabilizing member to ensure a stable attitude of the marker during operation of the spreader, the marker including at least one portion which is intended to penetrate the soil when the marker is in said stable position relative to the soil during operation of the spreader.

In use, the portion, or at least one of the portions, of the marker provides a clear track for indicating the area covered by the spreader, and at the same time the stabilizing member ensures such a position of the marker is such that the tracking portion remains in contact with the ground for tracing the track.

Preferably, the marker comprises a carrying member of elongated form, the penetrating portion being a lateral extension on said carrying member and being arranged near one end of the carrying member. Such extension may be a plate which lies substantially parallel to the center line of the carrying member.

The stabilizing member may extend away from the carrying member and lies in a plane which is substantially perpendicular to a plane containing the extension to which it is connected.

In an advantageous embodiment, the stabilizing member extends to either side of the carrying member.

An effective marker of simple construction is obtained if the carrying member is provided with two extensions disposed opposite each other with respect to the carrying member. Such a marker may be put down on the ground in a random manner without the risk of its having its wrong side down.

In a simple embodiment the stabilizing member is generally V-shaped, with the arms diverging to the rear, viewed in the intended direction of travel of the marker in use of the spreader. The stabilizing member may than comprise a V-shaped rod, the apex being secured to the front end of the carrying member.

For a better understanding of the invention and to show how the same may be carried into effect, reference will be made by way of example to the accompanying drawing, in which:

BRIEF DESCRIPTION OF THE DRAWINGS

FIG. 1 is a front view of a spreader having two markers;

FIG. 2 is a plan view of the spreader shown in FIG. 1;

DESCRIPTION OF THE DRAWINGS

Figure 3:
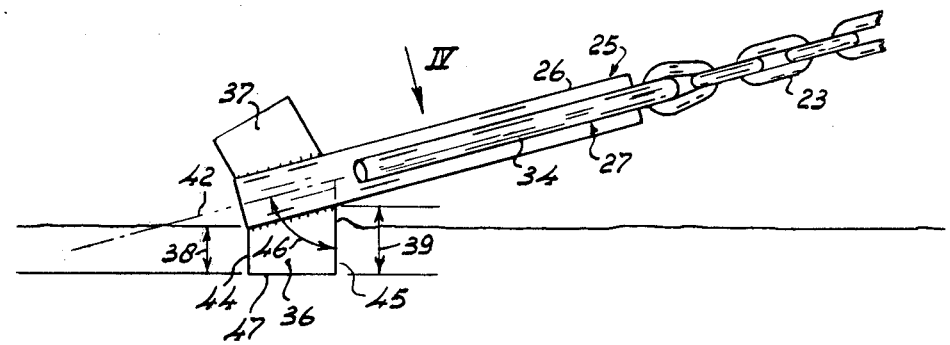
FIG. 3 is an enlarged view of a marker as seen in the direction III—III in FIG. 2.

The spreader shown in FIGS. 1 and 2 is suitable for distributing granular powdery material or both. The spreader comprises a frame 1 with a hopper 2. The hopper 2 has two delivery funnels 3 and 4, through each of which the material can be fed from the hopper to respective distributing members 18 and 19, which spread the material. Beneath the funnel 3 are located the ends of conveying members of the distributing member 18, which comprise conveyor belts 5, 6 and 7. Beneath the funnel 4 are located the ends of conveying members of the distributing member 19, which comprise conveyor belts 8, 9 and 10. The conveyor belts 5 to 7 transport the material towards respective spreading members 11, 12 and 13 which are adapted to rotate about upright axes. Near the ends of the conveyor belts 8 to 10 are arranged spreading members 14, 15 and 16, which are also adapted to rotate about upright axes for spreading the material.

To the outer ends of the distributing members 18 and 19, which extend laterally with respect to the intended direction of travel 17 of the spreader, are connected marker carriers 20 and 21. These carriers 20 and 21 are mounted for rotation relatively to the respective distributing members about horizontal axes extending parallel to the direction of travel 17. A marker 24 is connected to the carrier 20 by a flexible connecting member in the form of a chain 22 and a marker 25 is connected to the carrier 21 by a similar chain 23. The markers 24 and 25 are identical to each other in dimensions and shape and therefore, FIGS. 3 and 4 show only the marker 25.

The marker 25 comprises an elongate carrying member comprising a rod 26, which is completely made of metal, although other materials could be used. This rod 26 has a diameter 28 of 40 mms and a length 29 of 350 mms. Near the front end, viewed in the intended direction of travel 17, the rod 26 is provided with a V-shaped metal rod 27 constituting a stabilizing member. The curved portion 31 affording the apex of the V is welded to the front end of the rod 26, viewed in the intended direction of travel 17. The arms 34 and 35 of the V-shaped rod 27 have a length 30 of about 300 mms. The diameter 33 of the rod 27 is about 16 mms. The arms 34 and 35 of the rod 27, which are symmetrically disposed with respect to the rod 26, are at an angle 32 of about 60° to one another. The center lines 40 and 41 of the arms 34 and 35 of the rod 27 are coplanar with the center line 42 of the rod 26. Two extensions constituted by plates 36 and 37 are fixed to the rod 26 and lie in a plane which is perpendicular to the plane containing the center lines of the arms 34 and 35 and the rod 26. The plates 36 and 37 are disposed at the rear end of the rod 26, viewed in the intended direction of travel 17 and are located opposite each other with respect to the rod 26. The plates lie in a plane which contains the center line 42. With respect to the intended direction of travel 17, the plates extend slightly to the rear away from the rod 26. The plates have a thickness 43 of about 10 mms. The front and rear edges 44 and 45 of each of the plates 36 and 37 are mutually parallel and are at an angle 46 of about 75° to the center line 42. The angle 46 opens towards the rear, viewed in the intended direction of travel 17. The front edge 45 of each plate has a length 39 of about 75 mms, whereas the rear edge 44 has a length 38 of about 40 mms. The outer edge 47 is perpendicular to the edges 44 and 45. The rear edge 44 of each plate meets the rear end of the rod 26.

During operation of the spreader material is fed from the hopper 2 via the conveyor belts 5 to 10 to the rotating spreading members 11 to 16. Each of these spreading members spreads the material over a given width such that the spreader distributes the material over a total width 50. The markers 24 and 25 are spaced apart by a distance equal to the width 50. During the travel of the spreader the markers make tracks on the surface of the soil covered by the material so that, for example, when fertilizer or seeds are spread on a field, the width covered will be marked by the tracks. The markers may be used simultaneously or a marker (for example, the marker 24) on one side may be used during travel in one direction across a field and the marker (for example, the marker 25) on the other side during travel in the opposite direction. In using only one marker, the other one may be brought out of operation (not shown). The markers 24 and 25 are drawn by means of the chains 22 and 23, by which they are connected to the marker carriers 20 and 21. The markers will move in a direction parallel to the length of the rods 26 along the surface to be covered. The arms 34 and 35 on the V-shaped rod 27, which are coplanar with the respective rod 26, ensure that, when a marker is put down on the ground, the plates 36 and 37 lie in a generally vertical plane so that during travel one of the wings is pressed into the soil by the weight of the marker and runs through the ground.

Figure 4:
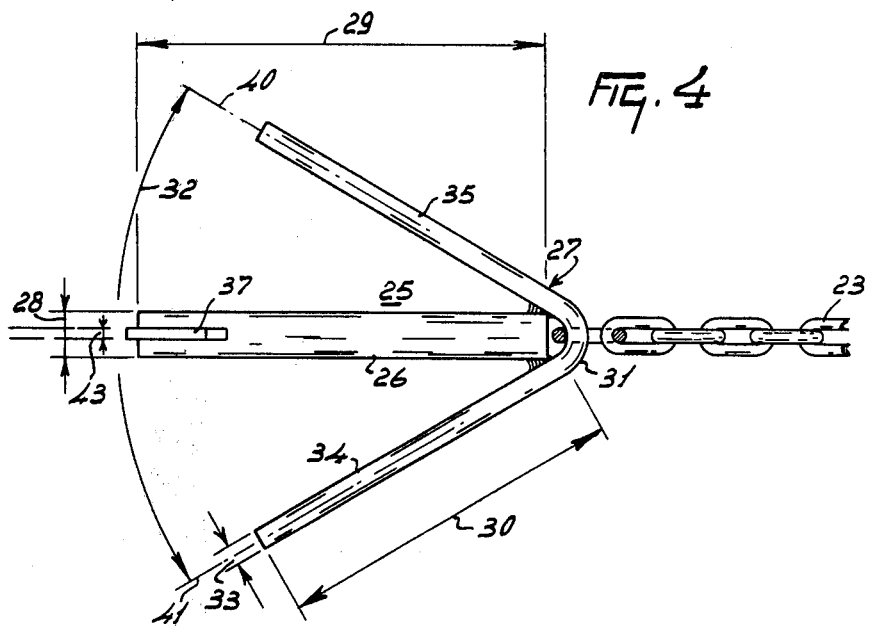
FIG. 4 is a plan view of the marker of FIG. 3 taken in the direction of the arrow IV in FIG. 3.

FIG. 3 shows the plate 36 sunk into the soil and during the run it cuts a narrow groove corresponding to the thickness 43 of the plate, this visible track marking the boundary of the area covered by the material during the run of the spreader. Particularly during a run across uneven fields the arms 34 and 35 of the rod 27 will have a stabilizing effect on the marker so that the plate 36 will be maintained in its generally vertically attitude in the soil. During tilting of the marker from the vertical due to unevennesses of the soil the arms 34 and 35 of the rod 27 may alternately come into contact with the ground so that they will emphasize the track indicating the boundary within which the material is spread. The dimensions and the material of the marker are preferably chosen so that its weight is about 4 kilograms. Although in the embodiment particularly described different dimensions are given for various parts of the marker, it will be appreciated that the dimensions may differ from the values mentioned above. Since two plates 36 and 37 are provided, it does not matter how the marker is put down on the ground. The arms 34 and 35 ensure that the plates 36 and 37 always remain in a more or less vertical plane so that, depending on how the marker is placed on the ground, either the plate 36 or the plate 37 points downwards to make a track in the soil.

Having thus described our invention, what we claim as new and desire to secure by Letters Patent of the United States is:

1. A spreader for distributing material which comprises a frame, a hopper carried on said frame, dispersing means for receiving said material from said hopper and broadcasting it onto the underlying ground, marker means connected to said frame to demarcate the outward bounds of said material which has been so broadcast onto the ground as the spreader is moved over same, said marker means comprising a carrier member comprising a straight rod, a V-shaped stabilizing member with said rod rigidly connected thereto at the apex of the "V," the longitudinal axes of the arms of said stabilizing member and of said rod being contained in the same plane, said rod extending at least to a line connecting the outboard ends of said arms, means mounted on the end of said rod opposite its connection to said arms adapted to provide a visible mark on the ground upon movement of the spreader which is the demarcation between ground which has received said material and ground which has not received said material.

2. A marker in combination with a spreader for distributing material by broadcasting it on the ground and connection means for the marker for positioning it to demarcate the outward bounds of material which has been broadcast from the spreader, a marker comprising a V-shaped stabilizing member with said connection means attached at its apex, a straight rod firmly attached to said stabilizing member at its apex and extending therefrom between the arms of said rod, an earth penetrating means extending outwardly therefrom at the end of said rod opposite its attachment to said stabilizing member whereby when said marker is drawn across the underlying ground by said connection means it penetrates the ground and produces a furrow which is substantially the demarcation between the ground which has received recently broadcast material and the ground which has not received same.

3. In combination with means for applying material, such as fertilizer and seeds to the underlying ground, a marker for demarcating the bounds of such application of material, the marker comprising flexible connection means for connecting it to the means for applying said material and positioning it in a substantially predetermined position relative to said material applying means, carrier means mounting said demarcation means, said carrier means attached to said connection means, and stabilizing means affixed to either side of said carrier means adapted to stabilize the relative position of said demarcation means to the underlying ground and the material applying means, said demarcation means being provided with extension means extending substantially perpendicular to said stabilizing means whereby said demarcation means provides a visible mark on the ground upon movement by said material applying means relative thereto which demarcates the portion of the ground to which said material has been applied and that portion of the ground which said material has not been applied.

4. A spreader comprising a frame, a hopper, and at least one distributing member for distributing material supplied from said hopper, and a marker which is connected to said spreader, said marker comprising a carrying member of elongated form, said carrying member being provided with a stabilizing member extending to either side of said carrying member whereby the center lines of the parts of said stabilizing member extending one on each side of said carrying member are substantially coplanar with the center line of said carrying member to ensure a stable attitude of the marker during operation of said spreader, said carrying member having a lateral extension intended to penetrate the soil when said marker is in said stable position to mark the soil during operation of said spreader, said extension being provided proximate one end of said carrying member.

5. A spreader as claimed in claim 4, wherein said extension comprises a plate and extends substantially parallel to the center line of said carrying member.

6. A spreader as claimed in claim 5, wherein said stabilizing member extends away from said carrying member and lies in a plane which is substantially perpendicular to a plane containing said extension.

7. A spreader as claimed in claim 4, wherein said stabilizing member is fastened proximate the end of said carrying member opposite the end proximate which said extension is connected.

8. A spreader comprising a frame, a hopper, and at least one distributing member for distributing material supplied from said hopper, and a marker which is connected to said spreader, said marker comprising a carrying member provided with a stabilizing member extending to either side of said carrying member whereby the center lines of the parts of said stabilizing member extending one on each side of said carrying member are substantially coplanar with the center line of said carrying member to ensure a stable attitude of said marker during operation of said spreader, said carrying member having a lateral extension which lies in a plane which is substantially perpendicular to the said plane including the said parts of the stabilizing member to penetrate the soil when the marker is in said stable position for marking the soil during operation of said spreader.

9. A spreader as claimed in claim 8, wherein said carrying member is provided with two extensions located opposite each other with respect to the carrying member.

10. A spreader as claimed in claim 9, wherein said stabilizing member is generally V-shaped, the arms of which diverge towards the rear, viewed in the intended direction of travel of said marker in operation of the spreader.

11. A spreader as claimed in claim 10, wherein said stabilizing member comprises a V-shaped rod, the apex of which is fastened to the front of said carrying member, viewed in the intended direction of travel of said marker.

12. A spreader as claimed in claim 10, wherein said arms of said stabilizing member are at an angle of about 60° to one another.

13. A spreader as claimed in claim 10, wherein said apex of the stabilizing member is connected to the spreader by a connecting member.

14. A spreader as claimed in claim 13, wherein said connecting member is flexible.

15. A spreader as claimed in claim 14, wherein said connecting member is a chain.

16. A spreader as claimed in claim 12, wherein said carrying member comprises a metal rod.

17. A spreader as claimed in claim 16, wherein said carrying member has a substantially circular cross-section.

18. A spreader as claimed in claim 8, wherein said extension is inclined to the rear from said carrying member, viewed in the intended direction of travel of said marker.

19. A spreader as claimed in claim 18, wherein the edge of said extension remote from said carrying member is inclined relative to the center line of said carrying member.

20. A spreader as claimed in claim 19, wherein one edge of said extension extending away from said carrying member joins the rear end of said carrying member, viewed in the intended direction of travel of said marker.

21. A spreader as claimed in claim 20, wherein said carrying member has a length of about 350 millimeters.

22. A spreader as claimed in claim 21, wherein said carrying member has a thickness of about 40 millimeters.

23. A spreader as claimed in claim 22 wherein said extension extends outwardly from said carrying member by a distance which is about the thickness of said carrying member.

24. A spreader as claimed in claim 23, wherein the projection of said stabilizing member onto the center line of said carrying member is at least one-half the length of said carrying member.

25. A spreader as claimed in claim 24, wherein said projection of said stabilizing member onto the center line of said carrying member is approximately equal to two-thirds of the length of said carrying member.

26. A spreader as claimed in claim 25, wherein said extension covers a length, measured in a direction parallel to said carrying member, which is at least one-fifth of the length of said carrying member.

* * * * *